US008243719B1

(12) United States Patent
Fillinger et al.

(10) Patent No.: US 8,243,719 B1
(45) Date of Patent: Aug. 14, 2012

(54) SYSTEMS AND METHODS FOR CALL SCHEDULING

(75) Inventors: Ryan James Fillinger, Helotes, TX (US); Kenneth James Havens, San Antonio, TX (US); George Charles MacNair, San Antonio, TX (US); Aubrey Lawrence Bordovsky, San Antonio, TX (US); Michelle Lynn Easton, Boerne, TX (US); Micky Chamberlain Reeves, San Antonio, TX (US); Timothy Ray Lamb, San Antonio, TX (US); Alfa Marie Ramirez, San Antonio, TX (US); Aaron David Bend, San Antonio, TX (US); Patrick Anthony Terrell, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 1093 days.

(21) Appl. No.: 12/140,420

(22) Filed: Jun. 17, 2008

(51) Int. Cl.
*H04L 12/66* (2006.01)
(52) U.S. Cl. ........................................ 370/352; 715/753
(58) Field of Classification Search .................. 370/352; 715/753
See application file for complete search history.

(56) References Cited

U.S. PATENT DOCUMENTS

| 5,819,263 | A | 10/1998 | Bromley et al. |
| 6,085,166 | A | 7/2000 | Beckhardt et al. |
| 6,212,268 | B1 | 4/2001 | Nielsen |
| 6,216,110 | B1 | 4/2001 | Silverberg |
| 6,731,732 | B2 | 5/2004 | Creamer et al. |
| 7,188,073 | B1 | 3/2007 | Tam et al. |
| 2001/0026609 | A1 | 10/2001 | Weinstein et al. |
| 2002/0059283 | A1 | 5/2002 | Shapiro et al. |
| 2006/0031097 | A1* | 2/2006 | Lipscher et al. .................. 705/2 |
| 2009/0323670 | A1* | 12/2009 | Altberg et al. ................ 370/352 |
| 2010/0281398 | A1* | 11/2010 | Melideo ........................ 715/753 |

OTHER PUBLICATIONS

Beard, David et al., "A Visual Calendar for Scheduling Group Meetings", CSCW '90 Proceedings, Oct. 1990. Department of Computer Sciences, University of North Carolina, Chapel Hill, NC. 12 pages.

* cited by examiner

*Primary Examiner* — Creighton Smith
(74) *Attorney, Agent, or Firm* — Brooks, Cameron & Huebsch, PLLC

(57) ABSTRACT

A calendar may be provided to a user via a computing device and may provide a schedule of availability of one or more advisors for a call with the user. The user may schedule a call with a particular advisor or an advisor having expertise in a particular subject area, such as life insurance, annuities, savings accounts, credit cards, financial and retirement planning, etc. When the user requests a call with an advisor in a particular subject area, the calendar may show a composite of availabilities of the various advisors having expertise in a particular subject area or are associated with a particular subject area group. The user may schedule a call, modify or cancel an existing scheduled call, and provide information pertaining to a call request or scheduled call, for example, via the user computing device.

18 Claims, 7 Drawing Sheets

| 210 | March 11 | March 12 | March 13 | March 14 | March 15 |
|---|---|---|---|---|---|
| 8:00 a.m. | Available | | Available | | |
| 8:30 a.m. | | | Available | | |
| 9:00 a.m. | | | | | Available |
| 9:30 a.m. | 250 | | | | Available |
| 10:00 a.m. | Available | | | | |
| 10:30 a.m. | Available | | | Available | |
| 11:00 a.m. | | | | Available | |
| 11:30 a.m. | | | | Available | |

220 (top right)
230 (bottom)

Select an open date and start time from the calendar

Verify your time zone: Central (CT) — 240

SYSTEMS AND METHODS FOR CALL SCHEDULING

CROSS REFERENCE TO RELATED APPLICATIONS

This application is related to U.S. patent application Ser. No. 12/244,490 filed Oct. 2, 2008, and U.S. patent application Ser. No. 12/244,509 filed Oct. 2, 2008, filed as divisional applications of the instant application, the disclosures of which are incorporated in their entirety.

BACKGROUND

When a user calls an institution to speak with a service advisor, many times the user may have to wait on a queue to speak with the service advisor. The user may decide not to wait and hang up. In this manner, the user may delay or never speak with the service advisor, which may cost the institution good will and/or a transaction of products or services with the user.

In order to schedule a call with a service advisor, a user must call into an institution and speak with a representative, and have the representative determine available times for the service advisor and schedule a call at an available time for the user and the service advisor. This often is a time-consuming and frustrating experience for the user. A user is not well-served if they have difficulty speaking with an institution's service advisor.

SUMMARY

A calendar may be provided to a user via a computing device and may provide a schedule of availability of one or more advisors for a call with the user. The user may schedule a call with a particular advisor or an advisor having expertise in a particular subject area, such as life insurance, annuities, savings accounts, credit cards, financial and retirement planning, etc. Each advisor may be associated with one or more subject areas.

In an implementation, when the user requests a call with an advisor in a particular subject area, the calendar may show a composite of availabilities of the specific and/or various advisors having expertise in the particular subject area or are associated with the particular subject area group.

In an implementation, the user may schedule a call, modify or cancel an existing scheduled call, and provide information pertaining to a call request or scheduled call, for example, via the user computing device. The user may block a specific time slot on the calendar for a call with an advisor. The time slots may be in particular increments of time, such as 15 minutes, 30 minutes, 60 minutes, for example. The increments of time in the time slots provided on the calendar may be based on the subject area of the call.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 2 is a diagram of an example calendar;

DETAILED DESCRIPTION

Figure 1:
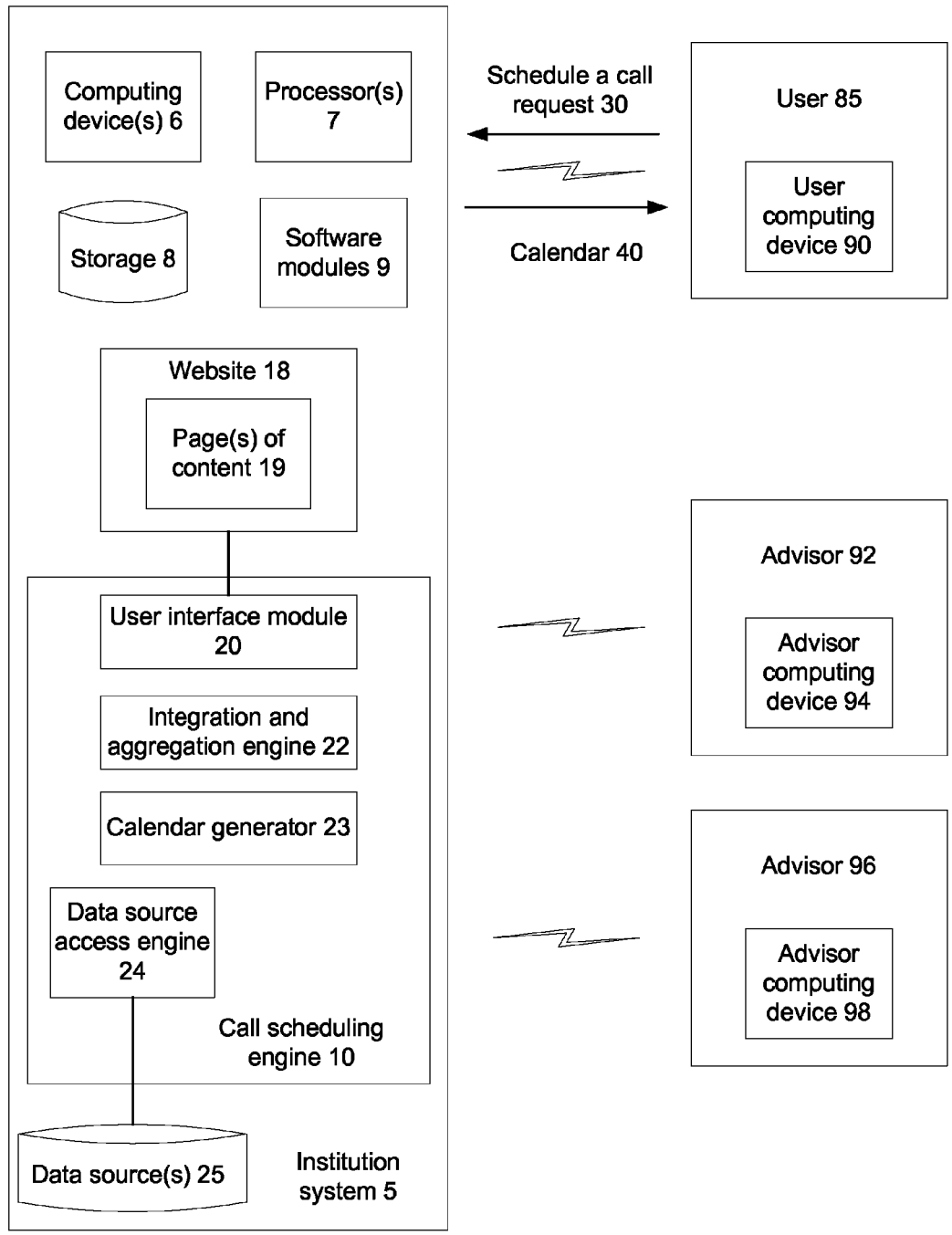
FIG. 1 is a block diagram of an implementation of a system that may be used to provide call scheduling.

FIG. 1 is a block diagram of an implementation of a system that may be used to provide call scheduling. An institution system 5, associated with or otherwise maintained by an institution such as a financial services institution, may include a call scheduling engine 10. The call scheduling engine 10 may receive a schedule a call request 30 from a user 85 via a user computing device 90 and may provide a calendar 40 to the user 85 via the user computing device 90 in response. The user 85 does not have to call the institution to schedule a phone call with an advisor, and can schedule the call online. The user 85 may be provided with access to an advisor's calendar so the user 85 can schedule a time on the advisor's calendar when the advisor is available for a call. An example user computing device 90 is described with respect to FIG. 7. The user 85 may be associated with the institution (e.g., a member of the institution) or may be external to the institution.

The user computing device 90 and the institution system 5 may be connected over a network. It is contemplated that the network may be any type of private or public communication network such as, for example, an intranet, Internet, local area network (LAN), wide area network (WAN), wireless fidelity (WiFi) network, cellular connection, plain old telephone service (POTS), and the like. The network also may connect entities advisors 92 and 96, described further herein, to the institution system 5 via their associated advisor computing devices 94 and 98, respectively. An example advisor computing device is described with respect to FIG. 7.

The calendar 40 that may be provided to the user 85 may provide a schedule of availability of one or more advisors for a call with the user 85. The user 85 may request to speak with a particular advisor or an advisor having expertise in a particular subject area, such as life insurance, annuities, savings accounts, credit cards, financial and retirement planning, etc. Each advisor may be associated with one or more subject areas. When the user 85 requests a call with an advisor in a particular subject area, the calendar 40 may show a composite of availabilities of the various advisors having expertise in a particular subject area or are associated with the particular subject area group of advisors. An example calendar 40 is described with respect to FIG. 2. Although only two advisors are shown in FIG. 1, it is contemplated that any number of advisors and associated advisor computing devices may be in communication with or otherwise associated with the institution system 5 and may be scheduled for a call with the user 85.

The call scheduling engine 10 may analyze, process, and store the data from the user 85 and the advisors 92, 96 in one or more data sources 25. The data may also be stored in other storage, perhaps in storage associated with the institution system 5 such as storage 8. The call scheduling engine 10 may use the data to generate the calendar 40 and schedule a call. Data that may be stored may include personal data about the user 85, contact data for the user 85, schedule data for the user 85, user account data, and schedule data for the advisors 92, 96. Data that may be stored may also include data pertaining to a scheduled call, such as date and time of call, subject area of the call, comments that the user 85 may have provided regarding the call, contact information for the user 85, reminder information for the user 85 and the advisor who is scheduled to participate in the call, additional persons who may attend the call and their contact information, etc., as described further herein.

In an implementation, scheduled call data may be stored and may include, for example, an identifier, subject area (e.g., a discussion topic), date and time of scheduled call, comments provided by the user when they scheduled the call, the type(s) and frequency of reminder(s) requested by the user (e.g., email, phone, etc., and 24 hours prior to the scheduled call, 30 minutes prior to the scheduled call, etc.), where the reminder should be sent (e.g., primary phone number, primary email address, etc.), which advisor will handle the call, the phone number the user wants to be called at, the user's time zone, etc. Additional data that may be stored include additional persons who may participate on the scheduled call, their relationship to the user, their phone numbers, etc.

The call scheduling engine 10 may include a user interface module 20, an integration and aggregation engine 22, a calendar generator 23, and a data source access engine 24. The user interface module 20 may generate and format one or more pages of content 19 as a unified graphical presentation that may be provided to the user computing device 90 as an output from the call scheduling engine 10. The page(s) of content 19 may be provided to the user computing device 90 via a website 18 associated with the institution system 5.

In an implementation, the user 85 may use the user interface module 20, for example, to schedule a call, modify or cancel an existing scheduled call, and to provide information pertaining to a call request or scheduled call, for example, via the user computing device 90. The user 85 may block a specific time slot on the calendar 40 for a call with an advisor. The time slots may be in particular increments of time, such as 15 minutes, 30 minutes, 60 minutes, etc., for example. Any increment(s) of time may be provided. The increments of time provided on the calendar 40 may be based on the subject area of the call (e.g., a calendar for a call on financial planning may be provided in 60 minute increments, a calendar for a call on life insurance may be provided in 30 minute increments, etc.).

In an implementation, instead of hosting the website 18, the institution system 5 may comprise a conventional application server hosting a proprietary online service accessible only a private network. In any event, the institution system 5 may have appropriate security mechanisms in place to prevent unauthorized third parties from intercepting the user's information.

The integration and aggregation engine 22 provides the call scheduling engine 10 the ability to retrieve data from data source(s) 25, storage 8, and other storage internal and/or external to the institution system, in an implementation, via the data source access engine 24. The integration and aggregation engine 22 may also receive data provided by the user 85 via the user computing device 90 and may receive data provided by an advisor via an advisor computing device. The data may be received via the user interface module 20 in an implementation. The retrieved and/or received data may be associated with the user 85 and one or more advisors 92, 96 and may be used to generate the calendar 40 and schedule a call.

The integration and aggregation engine 22 may provide data to the calendar generator 23. The calendar generator 23 may use tools, calculators, applications, and aggregators, for example to analyze user and advisor data and generate a calendar 40. In an implementation, the calendar generator 23 aggregates multiple advisors' calendars and availability to show total availability of at least one of the advisors, e.g. for a subject area, for a particular range of times and/or dates, etc. In another implementation, the integration and aggregation engine 22 may aggregate multiple advisors' calendars. The calendar generator 23 may use input from the user 85, received via the user interface module 20 for example, and information known about the user 85, received by the data source access engine 24 for example, to determine which advisor or advisors availability to request from the integration and aggregation engine 22.

In an implementation, data for the calendar 40 may be integrated into a single unified presentation, which may then be sent to the user interface module 20 for presentation to the user 85. Through this mechanism, the user 85 may quickly see the available time slots to schedule a call with a particular advisor and/or an advisor related to a particular subject area. Thus, in an implementation, the calendar 40 may be provided online, e.g. via the website 18, to the user 85, and the user may select a time slot for a scheduled call. The user 85 may interact with the calendar 40 and change inputs. At the user-selected date and time, an advisor calls the user 85.

In an implementation, an advisor may change their availability by accessing the calendar 40 associated with them using their advisor computing device. The advisor may change available time slots to "unavailable", for example. In an implementation, calendars or information pertaining to calendars for advisors and/or advisor groups related to subject areas may be provided to an administrator or management so that the administrator or management may determine if enough advisors are available to speak with users in a particular subject area at a particular time.

The user 85 may interface with the institution system 5 via the website 18 that may display one or more pages of content 19 to the user 85 on the user computing device 90. A request from the user 85 may be received at the institution system 5 through any suitable means, such as interaction with a web browser that is in communication with the call scheduling engine 10 or other computing device within the institution system 5. The actual mechanism of connection is outside the scope of the present discussion. The request may be processed by the call scheduling engine 10, which then provides the user 85 with a response to the request, e.g., in the form of the calendar 40. Calendars may be generated and exported via the website 18, and calls may be scheduled by selecting time slots on the calendars.

In an implementation, only a member or registered user of the institution system 5 may access the calendar 40. Alternatively, any user of the website 18 may access the calendar 40. In an implementation, access may be limited by various restrictions, such as a pilot group, products, age, etc., to allow only a target audience to access the calendar 40.

The user computing device 90 may provide user access to a system which is coupled to the call scheduling engine 10 and is configured to receive a plurality of user requests, at least one of which is a request to schedule a call with an advisor. A system may be configured to format and transmit a graphical user interface to user 85, and through the graphical user interface provide the user 85 with the ability to interact with and manipulate the data and calendar(s) provided by the institution system 5.

A user access system may be communicatively coupled to the call scheduling engine 10 and may be configured to send machine-readable instructions to the call scheduling engine 10. Those instructions may cause the call scheduling engine 10 to access data source(s) 25 and storage 8.

As mentioned above, the call scheduling engine 10 may provide a unified graphical presentation output. The unified graphical presentation may be transmitted to the user access system. In an implementation, the unified graphical presentation is combined with other materials and transmitted to the user 85. In an implementation, the unified graphical presentation is received by the user access system and transmitted directly to the user 85 without the inclusion of any other materials.

The user access system may be implemented as a web server in an implementation. The user access system, through the use of any suitable interactive web technology, provides an interactive experience to the user 85 through which access to and maintenance of the scheduled call data and calendar can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 5 may comprise one or more computing devices 6. The user computing device 90 may allow a user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user 85 may be stored in storage 8 or other storage such as data source(s) 25, for example.

Examples of software modules 9 may include modules for identifying and authenticating a user, generating web page content for display, and receiving requests and instructions from a user, described further herein. While specific functionality is described herein as occurring with respect to specific modules, the functionality may likewise be performed by more, fewer, or other modules. An example computing device and its components are described in more detail with respect to FIG. 7.

FIG. 2 is a diagram of an example calendar 40 that may be used with call scheduling. The calendar 40 may be presented as a two-dimensional grid of time of day 210 versus date 220. The dates provided may be for a particular period of time, such as a particular week. The grid may contain cells 230, with each cell corresponding to a particular time slot, such as a 15 minute block of time, a 30 minute block of time, etc. In an implementation, subject areas have built-in expected call durations, and the displayed grid on the calendar 40 has time slots with lengths corresponding to the expected call durations. Alternatively or additionally, the expected call duration could exceed the length of the time slots, so that a call may occupy multiple time slots. In an implementation, the user may select a time zone 240 (e.g., central time zone) and the time of day 210 of the calendar 40 may be displayed in the user-selected time zone 240.

The calendar 40 may display available time slots 250 that a call may be scheduled with a particular advisor or a member of an advisor group associated with a particular subject area. The user may click on or otherwise select an available time slot 250. A call may then be scheduled in the selected available time slot. The selected time slot for the particular advisor may then be marked as no longer available (e.g., to other users) on the calendar 40.

In an implementation, the calendar 40 may be generated based on a particular advisor's availability and/or calendar, or may be a composite of availabilities of members of an advisor group associated with the subject area of the call that is being scheduled. In a composite implementation, as long as any member of the advisor group is available during a time slot, that time slot is displayed as available and may be selected by a user for a scheduled call. In an implementation, the calendar for the advisor most skilled in the subject area may be presented to the user.

In an implementation, the user's calendar (e.g., from a service such as Yahoo!, Google, etc., or from an application such as Microsoft Outlook) may be synchronized with the calendar of a particular advisor or advisor group. The synchronized calendar may be presented to the user, and may display time slots when the user and the advisor or a member of the advisor group are both available. After the user selects a time slot for a scheduled call, both the user's calendar and the advisor's calendar may be updated with the scheduled call information. In an implementation, an advisor may use the calendar to schedule a call with a user. In an implementation, an advisor's calendar may be synchronized with the calendar of another advisor or advisor group.

Figure 3:
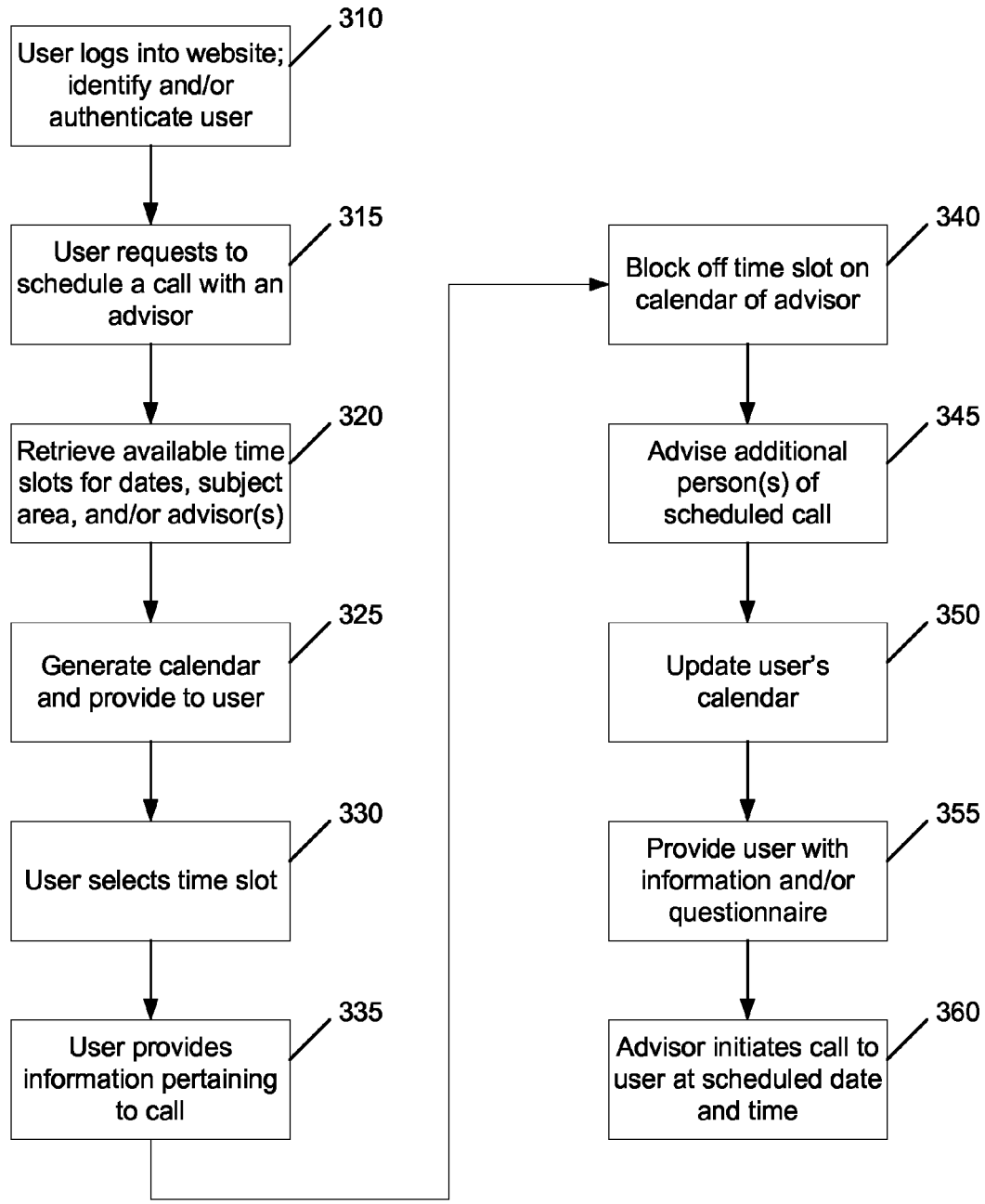
FIG. 3 is an operational flow of an implementation of a method that may be used to provide call scheduling.

FIG. 3 is an operational flow of an implementation of a method 300 that may be used to provide call scheduling. At operation 310, a user logs into the website associated with the institution, and may be identified and/or authenticated using known identification and/or authentication techniques. The website may provide an icon, a button, pull-down menu, etc. for a user to select to schedule a call with an advisor. At operation 315, the user may request to schedule a call for a subject area with a particular advisor or a member of an advisor group associated with the subject area. The user may choose a subject area and/or an advisor to schedule a call with. Subject areas may be shown to the user that are based on data that the institution has stored and retrieved or received pertaining to the user (e.g., marital status, loans, credit cards, number of dependents, products the user has, amount of assets, etc.).

At operation 320, available time slots for a given date range and subject area and/or advisor or advisor group are retrieved. If the user chooses to speak with any member of an advisor group for a selected subject area, scheduling data associated with each advisor that can handle the given subject area are retrieved and the availability is given in time slots that match the estimated duration of the call. All available time slots for a call to be scheduled that fall within the date range may be provided.

At operation 325, a calendar for an advisor and/or advisor group is generated and provided to the user. The available time slots for a particular advisor and for a particular topic may be presented.

Thus, the user may schedule a call online with an individual advisor (e.g., certified financial planner, select relationship manager, etc.) or an advisor group (e.g., retirement advisors, annuities, investment planning, retirement planning, 401k rollover, long term care, etc.), based on availability of the advisor or group. When the availability for a time slot is used up, that time slot may be removed. A calendar generator provides the user with a calendar to see advisor availability for a week in one view, for example, although which calendar is presented to the user may be determined in a formuladriven way based on a combination of the user's relationship with the institution and the subject area the user wants to discuss.

In an implementation, an immediate view of the advisors' schedules based on the user's time zone may be provided, giving the user the feeling of more control over their relationship with the institution, the ability to conduct transactions quickly and efficiently, and self-service. When a user is scheduling with an advisor group, the institution system may continually optimize available call offerings throughout the day to provide available time slots for calls between the user and an advisor sooner.

The user may select a time slot corresponding to a time and date on the calendar at operation 330. The selection may be made by clicking on or highlighting the time slot, in an implementation. At operation 335, the user may provide contact information (e.g., the phone number to be called at) and may note that one or more additional persons (e.g., their spouse, their children, the user's financial planner, other advisors, etc.) are to be included on call and may provide the additional person(s) names and contact information. The user may also provide comments that they would like the advisor to consider, e.g., ahead of the scheduled call. The user may also provide information pertaining to any reminders they would like to receive about the scheduled call.

At operation 340, the time slot may blocked off on the calendar for the advisor who will be scheduled to make the call to the user. The availability may also be removed from the calendar that may be presented to subsequent users. At operation 345, if the additional person(s) scheduled for the call are internal to, or associated with, the institution, they may be advised, e.g. they may be sent notification and reminders and their calendar(s) may be updated. In an implementation, at operation 350, the user's calendar may be updated based on the user's selection of scheduled call time.

At operation 355, the user may be provided with information and/or a questionnaire to review and/or fill out and return ahead of call. The user may be provided with information pertaining to the call, such as a list of documents the user needs for the call, an online questionnaire (e.g., via a link to a website) for the user to fill out ahead of the call, reference documents the user should read ahead of the call, etc. At operation 360, at the scheduled date and time, the advisor may initiate the call to the user.

Figure 4:
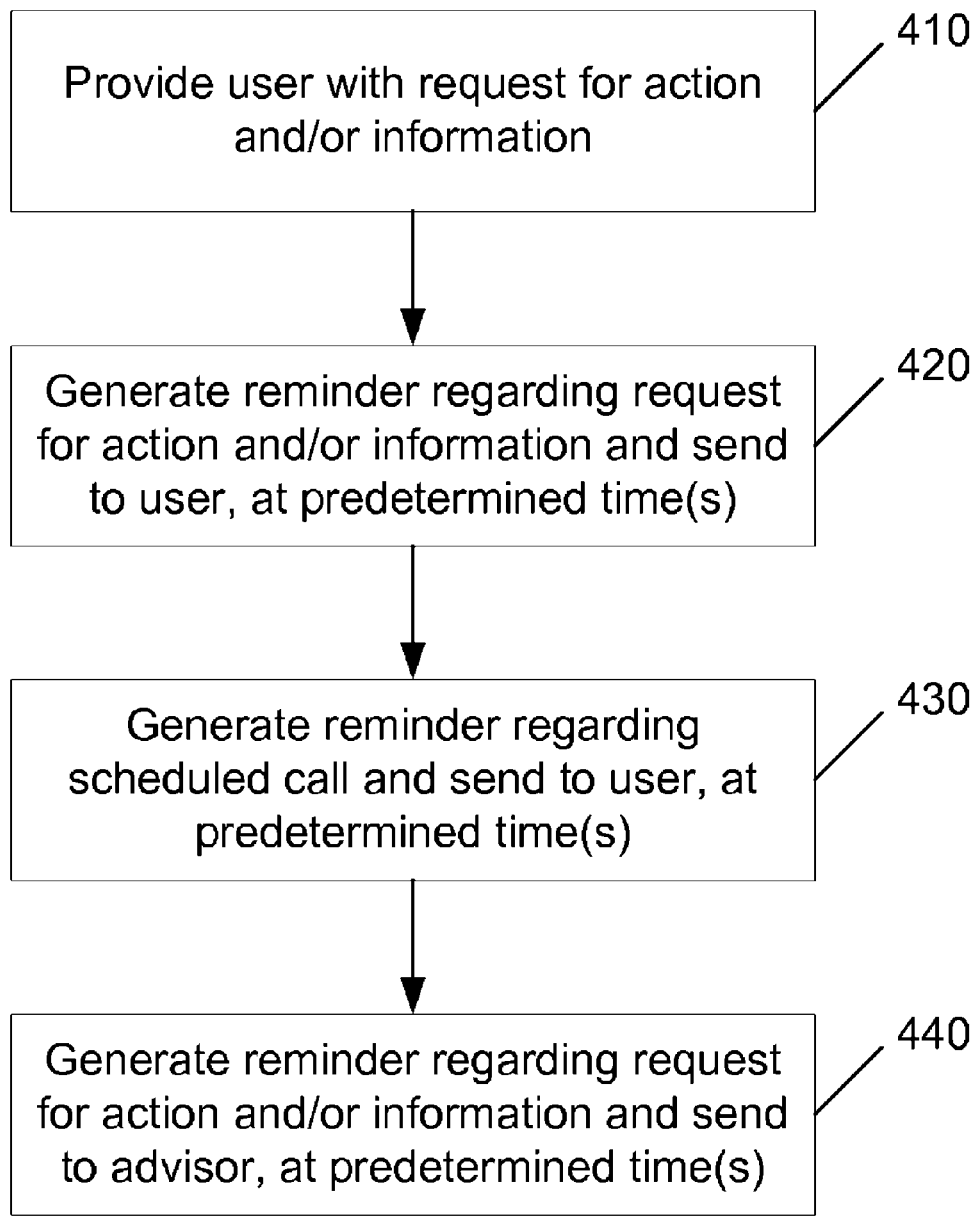
FIG. 4 is an operational flow of an implementation of a method that may be used to provide a reminder about a scheduled call.

FIG. 4 is an operational flow of an implementation of a method 400 that may be used to provide a reminder to a user and/or an advisor about a scheduled call. During the scheduling of a call or thereafter, a request for action and/or information may be provided to the user at operation 410. In an implementation, the action may include a list of items for the user to gather and/or prepare ahead of the call or documentation the user should read ahead of the call. In an implementation, the information requested from the user may include a response to a questionnaire. The request for action and/or information may be based on the subject are of the scheduled call, and may be provided to the user via one or more of email, telephone, facsimile, text message, website, or via a link to a website, for example. The contact or address information for the particular delivery technique(s) to the user may be retrieved from storage associated with the institution system.

At operation 420, at one or more predetermined times prior to the scheduled call, a reminder may be generated and sent to the user regarding the previously provided request for action and/or information. In an implementation, the reminder may be sent via one or more of email, telephone, facsimile, text message, website, or via a link to a website, using previously stored contact or address information. The predetermined times may be determined by the institution system and may be a predetermined number of minutes, hours, days, etc. prior to the scheduled call. In an implementation, when scheduling the call, the user may select the predetermined times for the action and/or information reminder(s), and may also select the delivery technique(s) for the reminder(s) as well as provide their contact or address information.

In an implementation, the institution system may check to determine whether the user has provided the requested information prior to sending a reminder. In an implementation, based on the subject area to be discussed at the call, the institution system may determine whether the user has filled out or otherwise responded to a questionnaire previously provided to the user. If not, a reminder may be sent to the user. If the user has responded to the questionnaire, then a reminder may not be sent.

At operation 430, at one or more predetermined times prior to the scheduled call, a reminder may be generated and sent to the user regarding the scheduled call, reminding the user of the date and time of the call, for example, as well as the subject area. In an implementation, the user may have previously selected how they want to be reminded of the scheduled call (e.g., one or more of email, telephone, facsimile, text message, website, or via a link to a website, etc.) and may have provided contact or address information. The user may also have selected when the reminder is to be delivered (e.g., number of minutes, hours, days, etc. prior to the call) and how often the reminder is to be delivered.

Responsive to the reminder, in an implementation, the user may revise the scheduled call information, such as changing the date and time of the scheduled call, cancelling the call, etc. The ability to revise the scheduled call information may be provided with the reminder, such as via a link to a website that the user may select. The user may then revise the scheduled call information on the website that is linked to. An implementation of revising scheduled call information is described with respect to the method 500 of FIG. 5.

At operation 440, the advisor may be sent a reminder about the scheduled call. The information may include the user's name and telephone number, the subject area, any user-provided comments or information, etc. The reminder to the advisor may be provided a predetermined number of times prior to the scheduled call and may be provided at predetermined times prior to the scheduled call.

Figure 5:
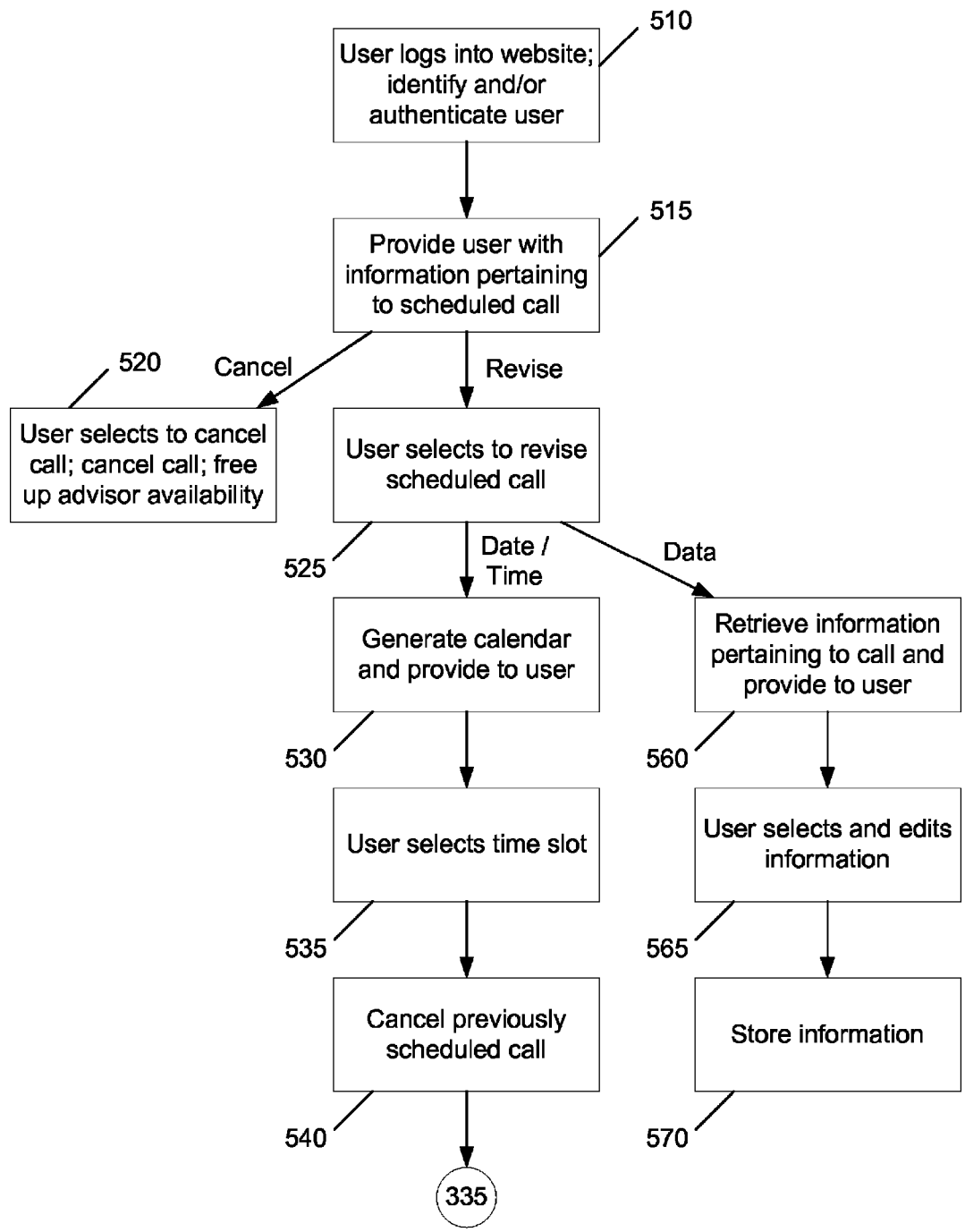
FIG. 5 is an operational flow of an implementation of a method that may be used to modify a scheduled call.

FIG. 5 is an operational flow of an implementation of a method 500 that may be used to modify a scheduled call. At operation 510, a user logs into the website, and is identified and/or authenticated. At operation 515, the user is provided with information pertaining to scheduled call.

If the user wishes to cancel the call, the user may select to cancel the scheduled call at operation 520. When a scheduled call is canceled, the availability of the advisor who was to make the scheduled call is freed up, and the scheduled call details are deleted along with any calendar entries and any reminders.

Alternatively, at operation 525, the user may choose to revise an existing scheduled call, e.g., via an icon, a button, pull-down menu, etc. for a user to modify the scheduled call with the advisor. A user may schedule multiple calls and revise one or more of the calls. If the user selects to revise the date and/or time of the scheduled call, at operation 530, a calendar is generated and provided to the user. At operation 535, the user may select another time and date for the call by selecting an available time slot on the calendar, similar to that described above with respect to the operation 330 of FIG. 3.

When a scheduled call is changed, the data pertaining to the call may be changed along with the persons who are scheduled to be on the call.

At operation 540, the previously scheduled call is canceled. Processing continues at operation 335 of FIG. 3. In an implementation, the data previously provided by the user pertaining to the scheduled call may be stored and presented to the user for review and possible revision.

Alternatively, the user may select to change data pertaining to the call (e.g., contact information or other information) instead of the date and time of the scheduled call. At operation 560, the previously stored information pertaining to the call is retrieved and provided to the user. The user may select and edit the information (e.g., address or contact information, comments, reminder details, etc.) at operation 565. The information may be stored at operation 570. In an implementation, processing may continue at operation 360.

In an implementation, a user may choose to be called back within a certain period of time (e.g., 24 hours, 48 hours, etc.) instead of selecting a specific appointment time.

Figure 6:
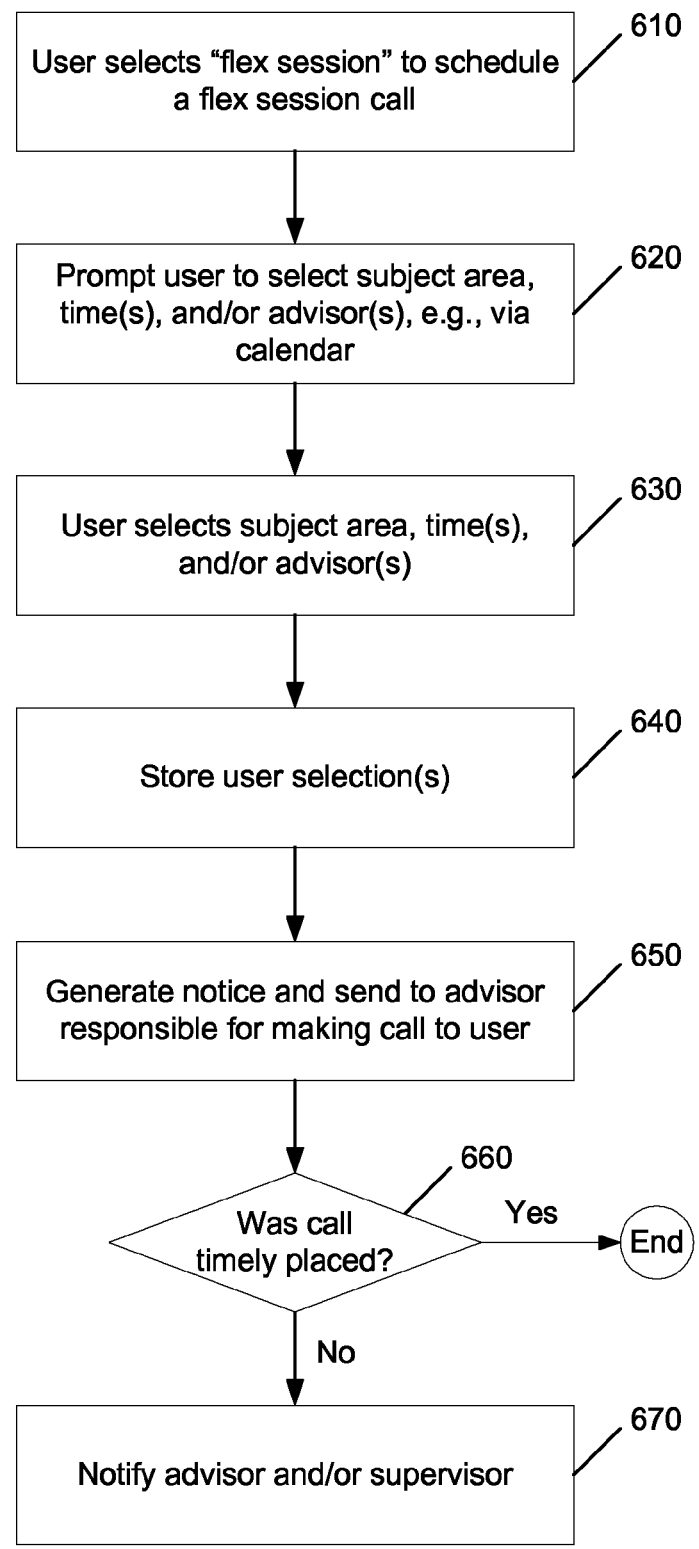
FIG. 6 is an operational flow of another implementation of a method that may be used to provide call scheduling.

FIG. 6 is an operational flow of another implementation of a method 600 that may be used to provide call scheduling. In an implementation, a user may not wish to specify a particular time for a call from an advisor, but instead with want to receive a call within a particular time period, such as anytime within the next 24 hours, anytime on a particular day or date in a range of times, such as between 8 am and 11 am, etc.

At operation 610, in an implementation, the user may select a "flex session", such as by selecting an appropriate button, tab, icon, etc., on a website. At operation 620, the user may be prompted to select a subject area, a particular advisor or an advisor group, and/or a time period for a call from a particular advisor or a member of the advisor group.

In an implementation, the user may select a subject area and a time period or range of times, and the institution system may provide a listing of relevant advisors that are available for the call within that time period. The user may then select an advisor with which they would like to speak. Alternatively or additionally, the user may select an advisor and may be apprised of when that advisor is available to speak, e.g., via a calendar such as a calendar 40 described with respect to FIG. 2. The user may then select a time slot when the advisor is available according to the calendar, by clicking on, highlighting, or otherwise selecting the time slot.

At operation 630, the user makes their selection(s), and the selection(s) may be stored by the institution system at operation 640. At operation 650, a notice may be generated and sent to the advisor who is responsible for making the call to the user within the time period or range of times. In an implementation, data pertaining to the call may be provided on the advisor's calendar.

At operation 660, after the time period for the call has elapsed, it may be determined whether the call had been made to the user, e.g., by checking a call log or following up with the user. If the call had been made to the user within the time period, processing may end; otherwise, the advisor and/or a supervisor may be notified at operation 670.

Exemplary Computing Arrangement

Figure 7:
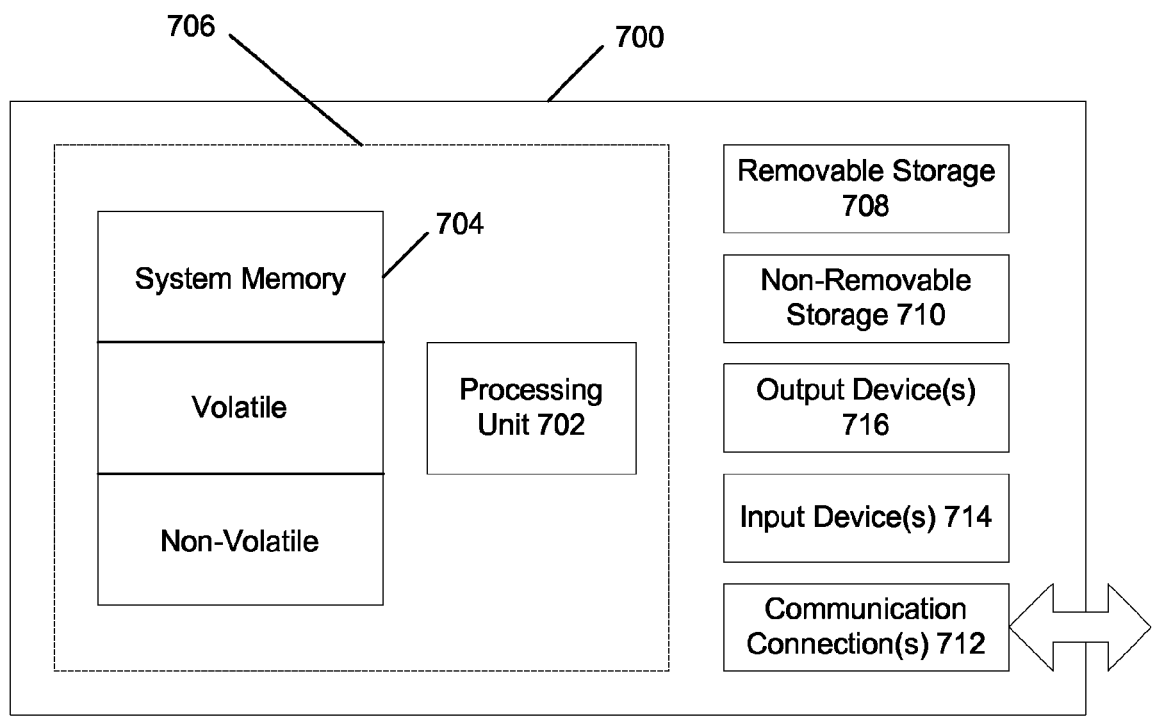
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and system memory 704. Depending on the exact configuration and type of computing device, system memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features and/or functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer-readable media. Computer-readable media can be any available media that can be accessed by computing device 700 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 704, removable storage 708, and non-removable storage 710 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communication connection(s) 712 that allow the computing device 700 to communicate with other devices. Communication connection(s) 712 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions for call scheduling, said computer-readable instructions comprising instructions that:
   receive a request from a user via a website to schedule a call with an advisor;
   provide a calendar to the user via the website showing an availability of the advisor for the call with the user;
   receive a selection of a time for the call from the user via the website;
   schedule the call between the user and the advisor for the time; and
   receive information from the user regarding at least one additional person to be included on the call with the user and the advisor.

2. The non-transitory computer-readable medium of claim 1, wherein the request comprises a subject area for the call.

3. The non-transitory computer-readable medium of claim 2, wherein the calendar comprises a plurality of time slots, each time slot having a length corresponding to an expected duration of the call.

4. The non-transitory computer-readable medium of claim 3, wherein the expected duration of the call is based on the subject area for the call.

5. The non-transitory computer-readable medium of claim 2, wherein the calendar shows the availability of at least one advisor of an advisor group associated with the subject area.

6. The non-transitory computer-readable medium of claim 1, further comprising instructions that retrieve data pertaining to the availability of at least one advisor and generate the calendar based on the data.

7. A call scheduling method, comprising:
   receiving a request from a user via a website to schedule a call with an advisor;
   providing a calendar to the user via the website showing an availability of the advisor for the call with the user;
   receiving a selection of a time for the call from the user via the website;
   scheduling the call between the user and the advisor for the time; and
   receiving information from the user regarding at least one additional person to be included on the call with the user and the advisor.

8. The method of claim 7, wherein the request comprises a subject area for the call.

9. The method of claim 8, wherein the calendar comprises a plurality of time slots, each time slot having a length corresponding to an expected duration of the call.

10. The method of claim 9, wherein the expected duration of the call is based on the subject area for the call.

11. The method of claim 8, wherein the calendar shows the availability of at least one advisor of an advisor group associated with the subject area.

12. The method of claim 7, further comprising retrieving data pertaining to the availability of at least one advisor and generating the calendar based on the data.

13. A call scheduling system, comprising:
   at least one subsystem that receives a request from a user via a website to schedule a call with an advisor;
   at least one subsystem that provides a calendar to the user via the website showing an availability of the advisor for the call with the user;
   at least one subsystem that receives a selection of a time for the call from the user via the website;

at least one subsystem that schedules the call between the user and the advisor for the time; and at least one subsystem that receives information from the user regarding at least one additional person to be included on the call with the user and the advisor.

14. The system of claim 13, wherein the request comprises a subject area for the call.

15. The system of claim 14, wherein the calendar comprises a plurality of time slots, each time slot having a length corresponding to an expected duration of the call.

16. The system of claim 15, wherein the expected duration of the call is based on the subject area for the call.

17. The system of claim 14, wherein the calendar shows the availability of at least one advisor of an advisor group associated with the subject area.

18. The system of claim 13, further comprising at least one subsystem that retrieves data pertaining to the availability of at least one advisor and generates the calendar based on the data.

* * * * *